Sept. 23, 1947.  C. W. MOTT  2,427,871
FLUID PRESSURE SERVOMOTOR WITH FOLLOW-UP DEVICE
Filed Nov. 21, 1942  9 Sheets-Sheet 1

Inventor:
Carl W. Mott.
By Paul O. Pippel
Atty.

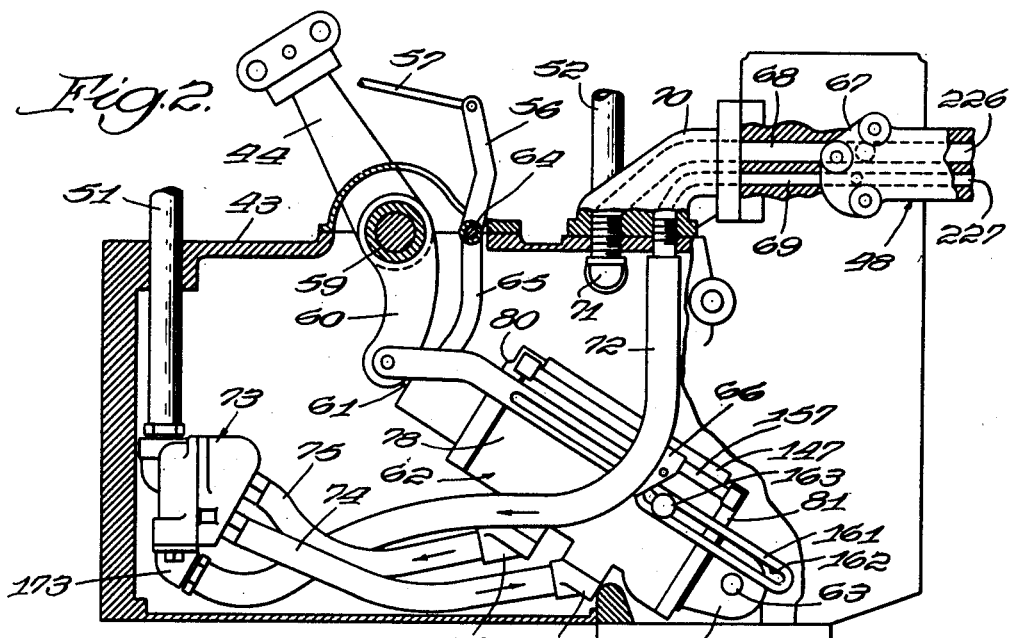
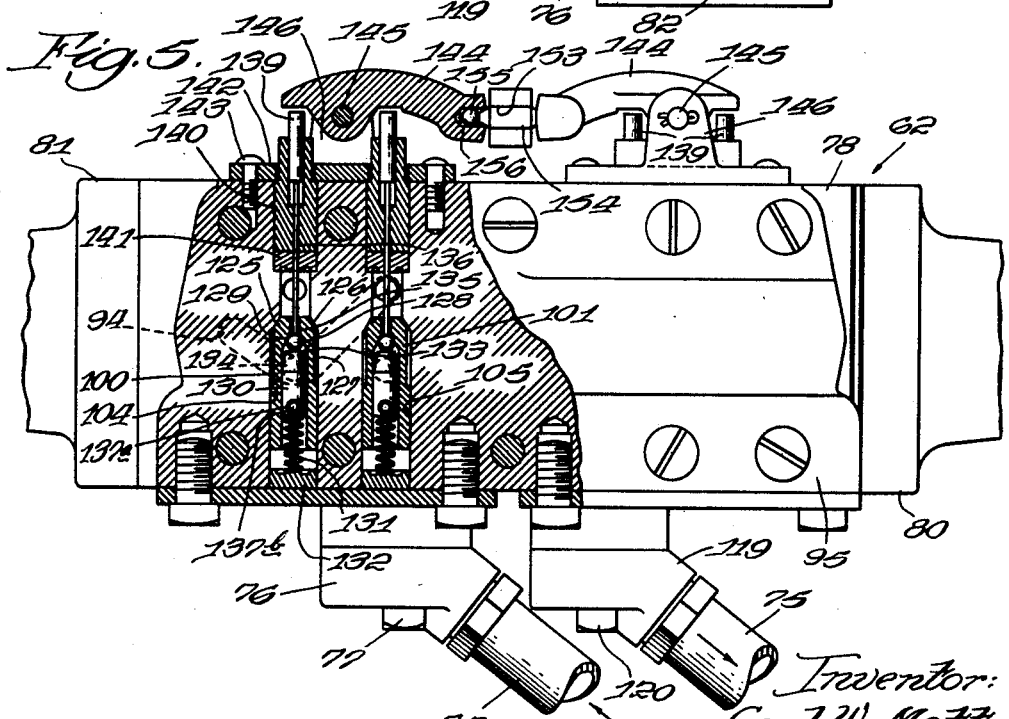

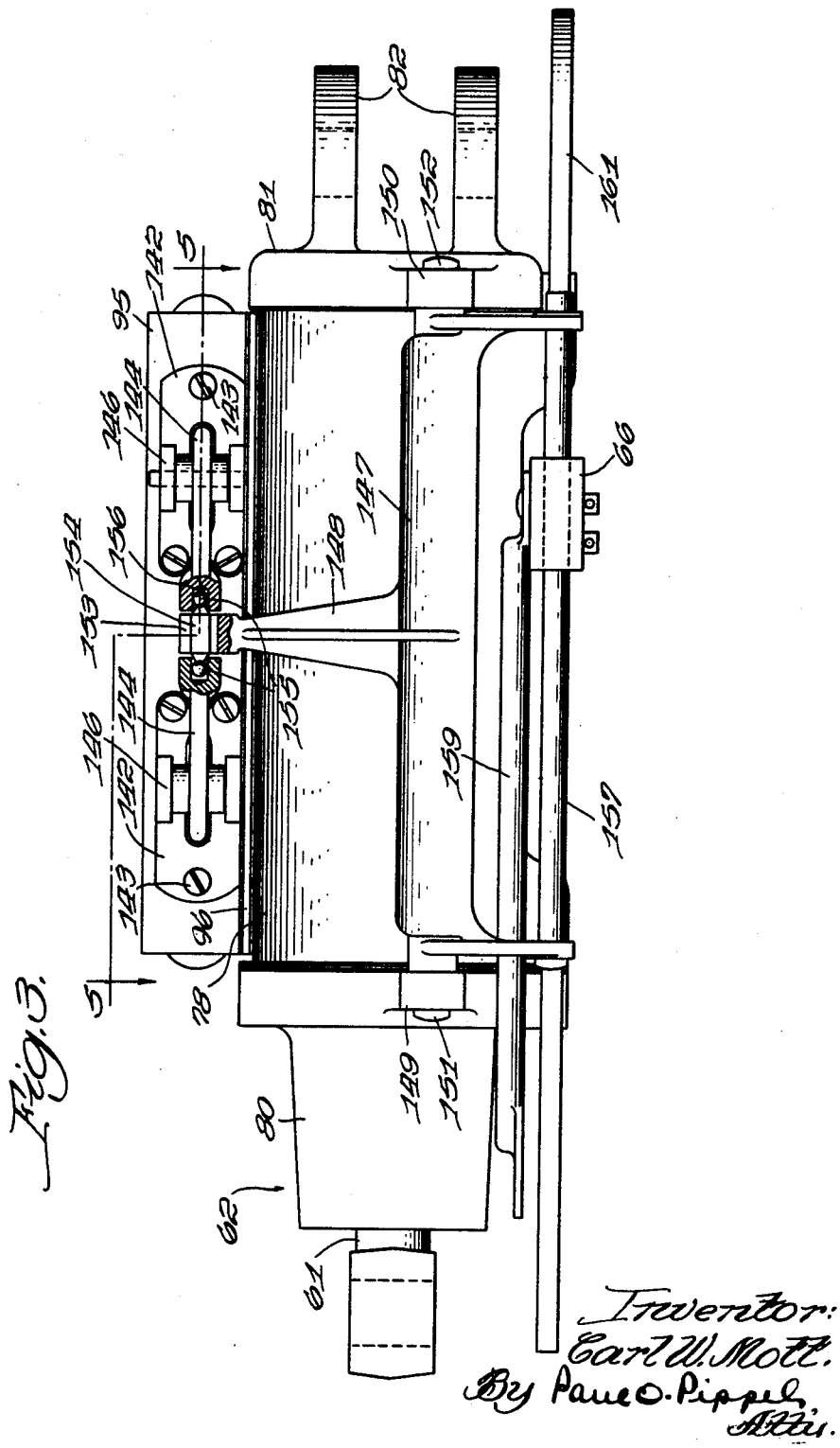

Sept. 23, 1947.    C. W. MOTT    2,427,871
FLUID PRESSURE SERVOMOTOR WITH FOLLOW-UP DEVICE
Filed Nov. 21, 1942    9 Sheets-Sheet 4

Inventor:
Earl W. Mott.
By Paul O. Pippel
Atty

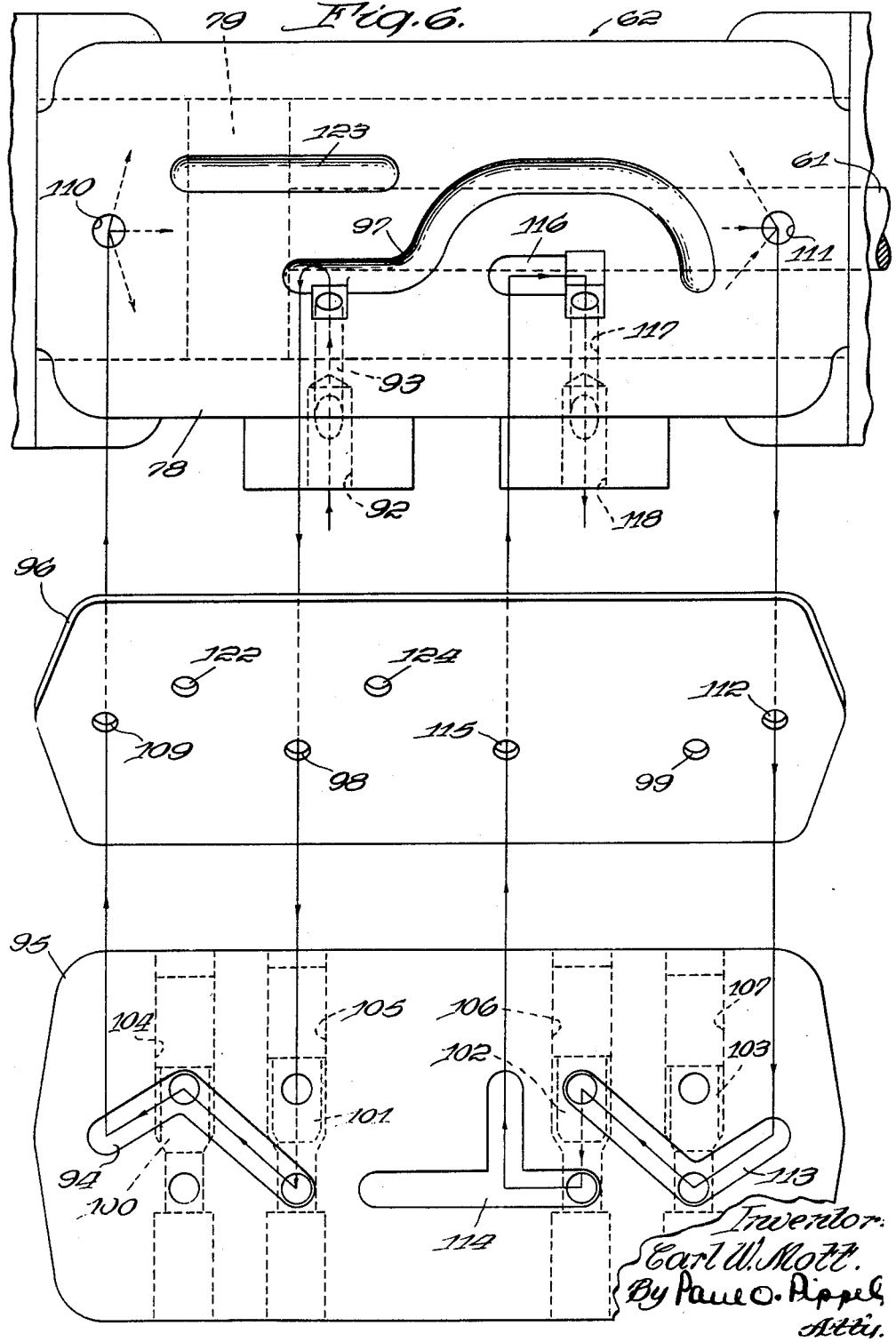

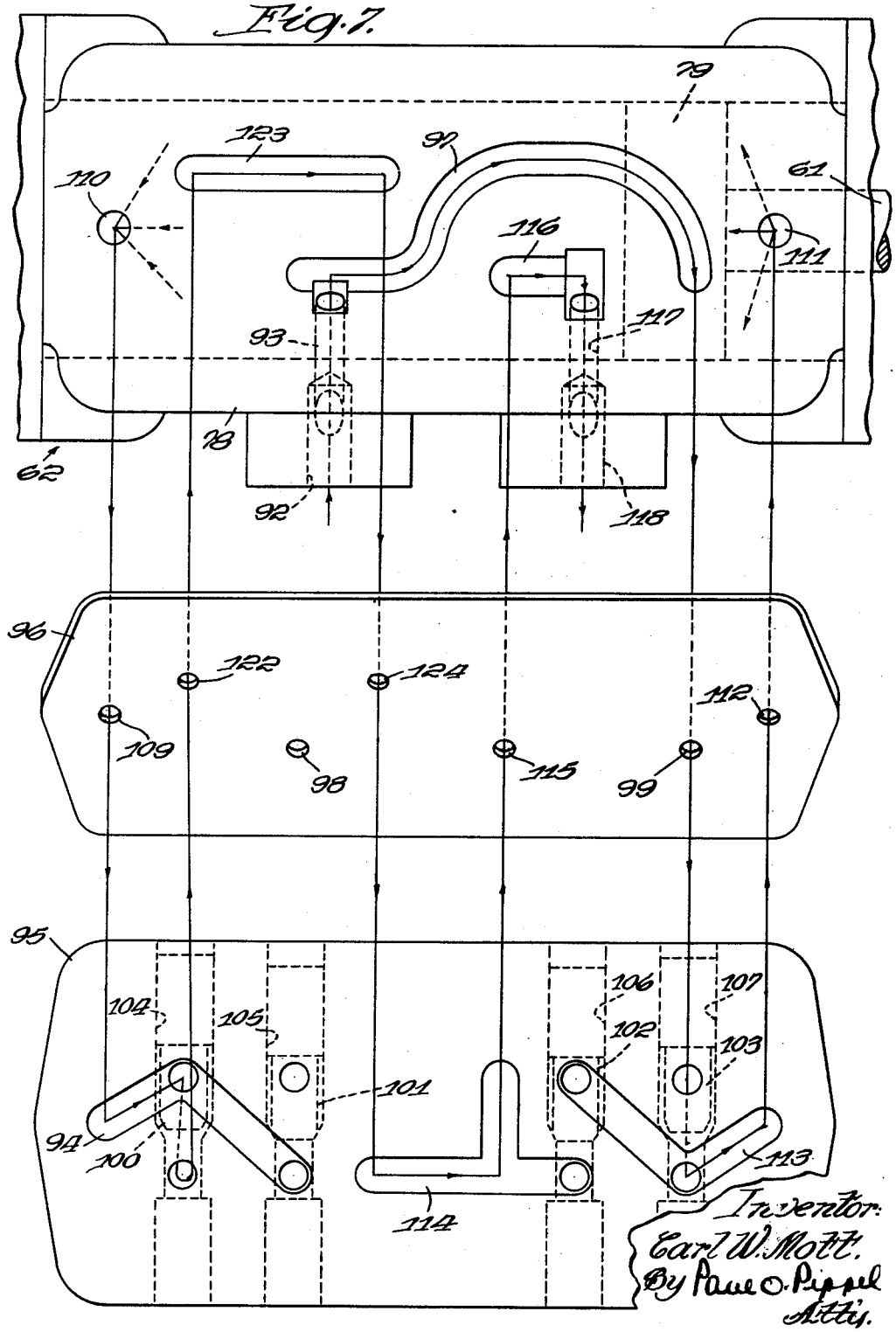

Sept. 23, 1947.　　　　C. W. MOTT　　　　2,427,871
FLUID PRESSURE SERVOMOTOR WITH FOLLOW-UP DEVICE
Filed Nov. 21, 1942　　　9 Sheets-Sheet 7
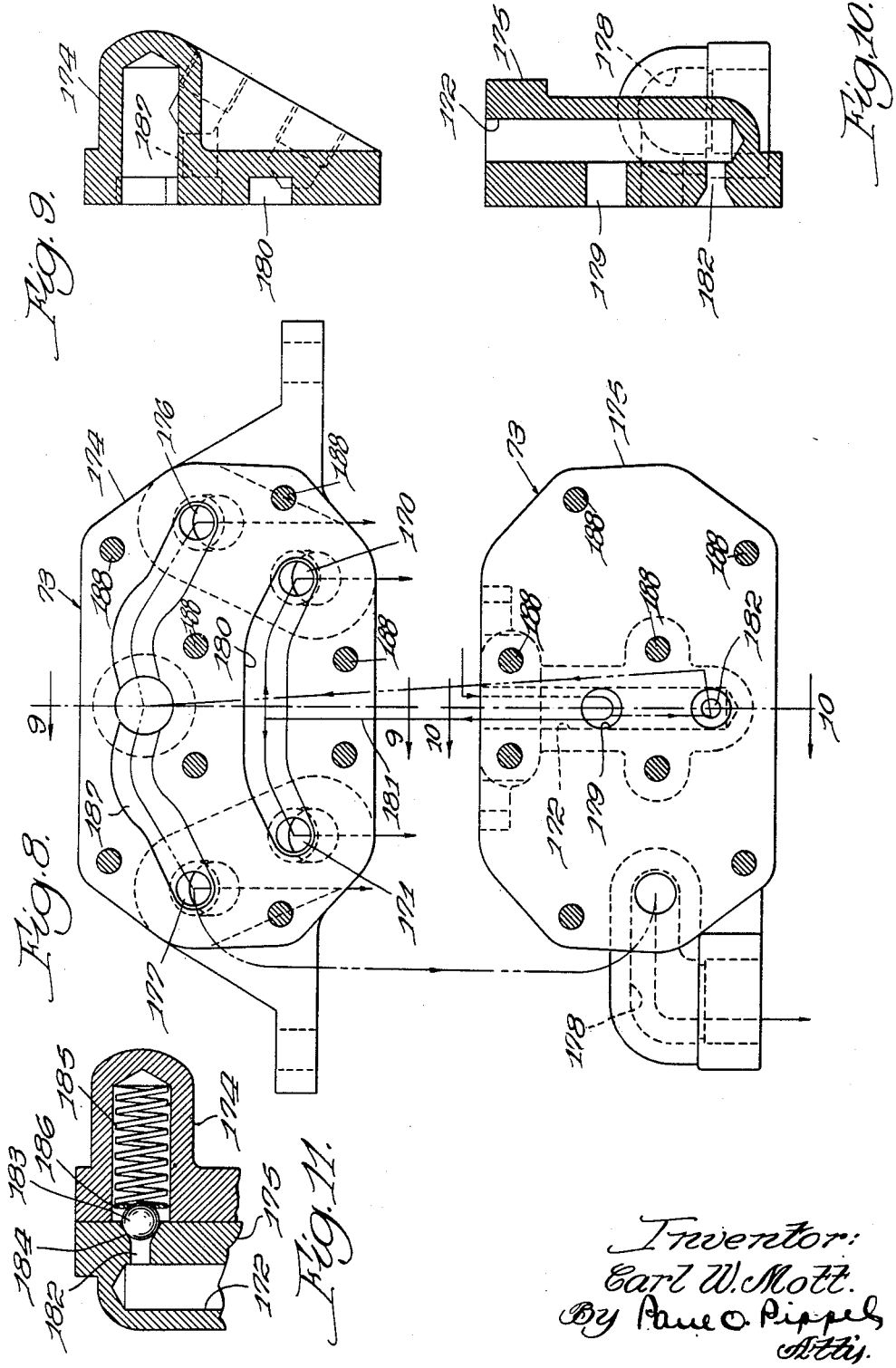

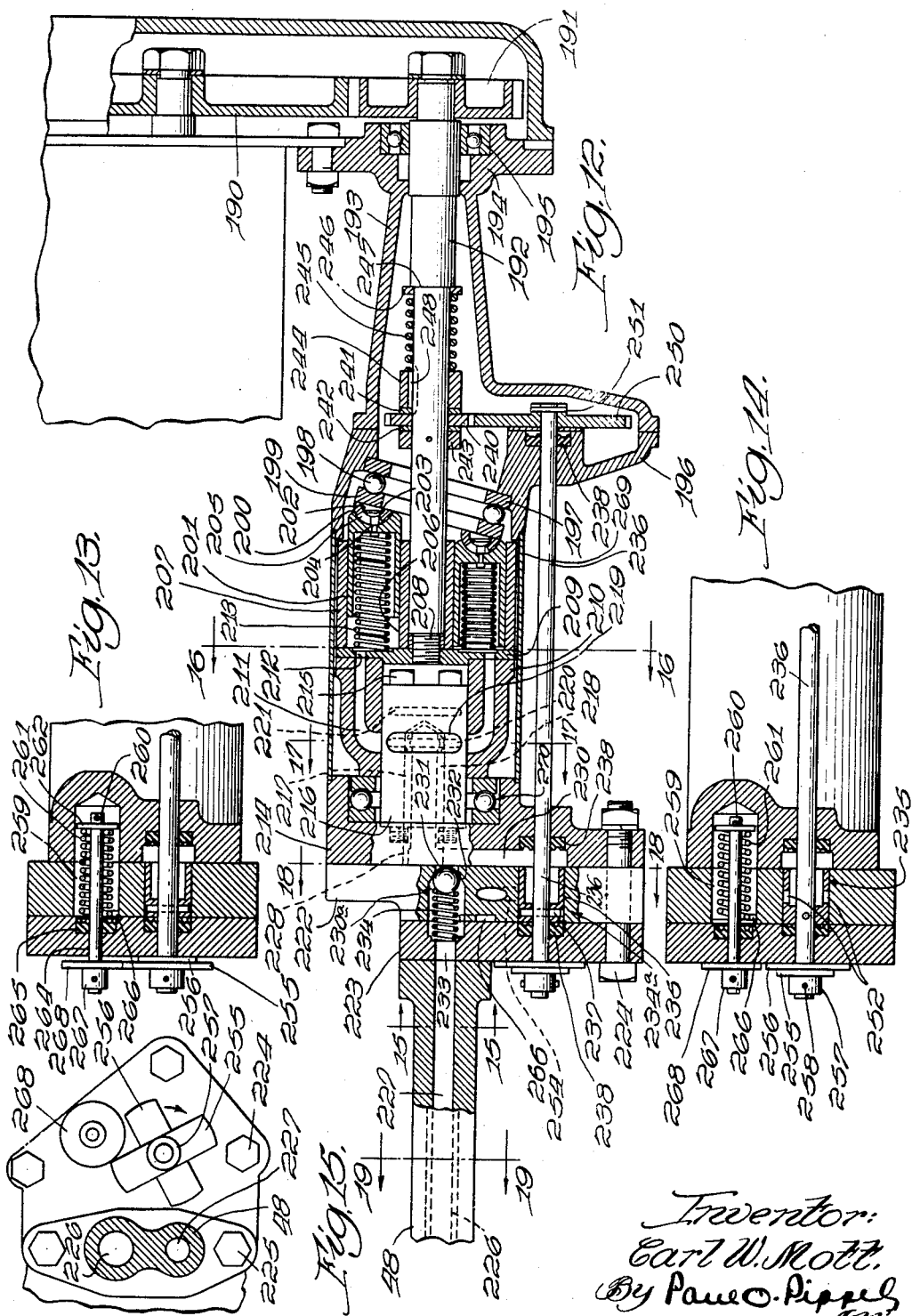

Sept. 23, 1947.  C. W. MOTT  2,427,871
FLUID PRESSURE SERVOMOTOR WITH FOLLOW-UP DEVICE
Filed Nov. 21, 1942   9 Sheets-Sheet 9
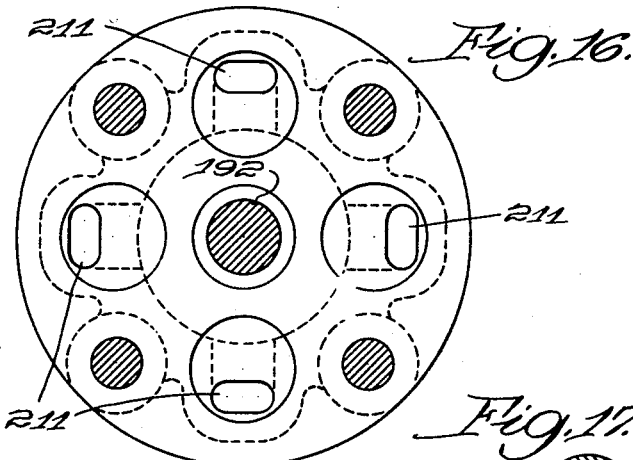
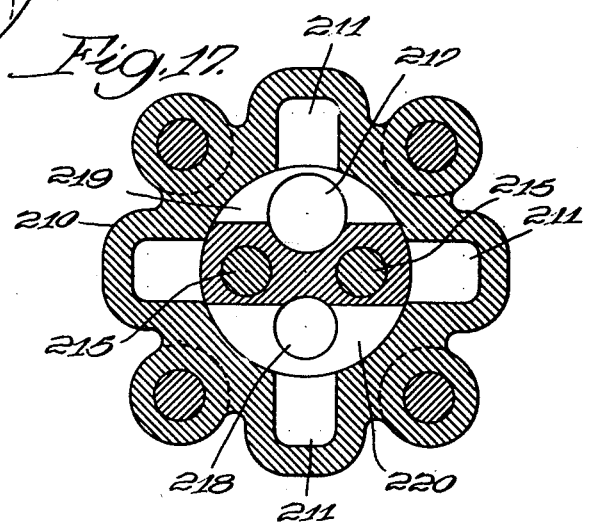
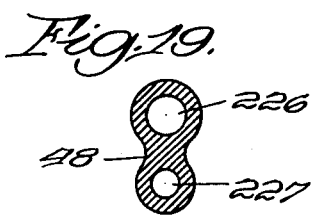
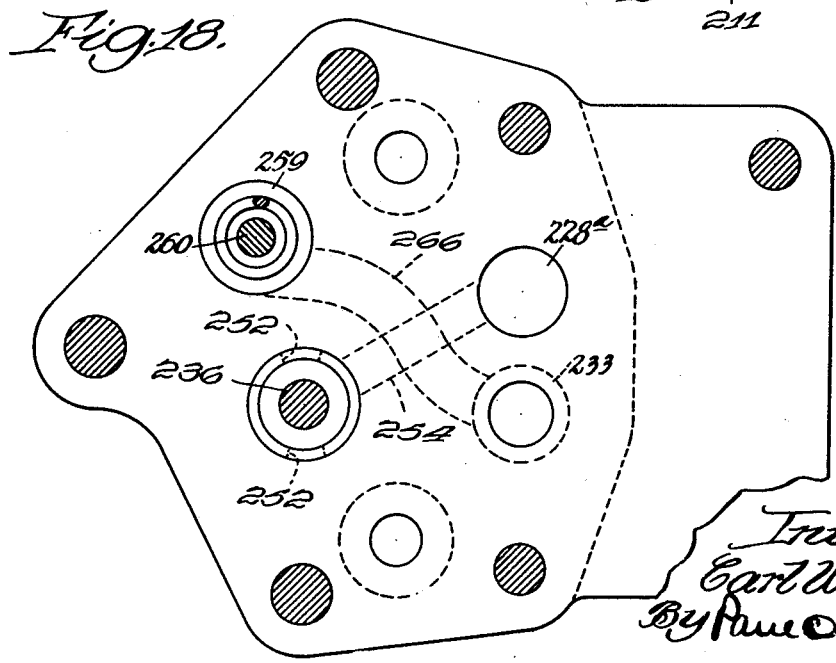

Patented Sept. 23, 1947

2,427,871

UNITED STATES PATENT OFFICE 2,427,871

FLUID PRESSURE SERVOMOTOR WITH FOLLOW-UP DEVICE

Carl W. Mott, La Grange, Ill., assignor to International Harvester Company, a corporation of New Jersey Application November 21, 1942, Serial No. 466,463

10 Claims. (Cl. 121—41)

1

This invention relates to tractor-mounted implements and more particularly to power lifting and power adjusting mechanism therefor.

It is an object of the present invention to provide a novel manually controlled power mechanism for use as with tractors for adjusting implements or the like associated therewith from one extreme position to another extreme position and of such design that delicate and precise adjustment of the implements may be had in accordance with the movement of a manually manipulatable control element.

It is another object of the invention to provide a fluid power arrangement for tractor-mounted implements which is so sensitive to a manual control element that the movement of the working tool for the purpose of adjusting the same in its working position is substantially instantaneous in its operation even though fluid power means is used in doing the actual work in adjusting the working tool.

It is still another object of the invention to provide a fluid operated device as a part of a fluid power arrangement and which carries with it a valve mechanism manually operable to introduce propelling fluid into the device and operable under control of said device to cut off the supply of propelling fluid thereto after predetermined operation of the device, all of which is unitarily assembled sufficiently compactly as to be easily enclosed within the hollow body portion of a tractor.

It is another object of the invention to provide fluid operated apparatus employing an improved multiple part casing wherein there are fluid conducting ducts having portions formed as open cavities in certain of said multiple parts and covered by other of such parts, as an expedient for avoiding difficult coring operations in the casting of the casing.

It is still another object of the invention to provide a fluid-operated arrangement having a source of fluid under pressure always on tap at a point in close proximity to the fluid-operated device to minimize time lag between adjustment of the manual control and the responsive adjustment of said device and consequently improve the precision with which said devices may be operated.

A further object of this invention is the provision in a fluid-operated control of a novel structure adapted for the utilization of poppet valves to render the apparatus suitable for use with fluid under high pressure.

A further object is the provision of a tool-

2 supporting vehicle installation comprising independently controllable fluid-operated arrangements on opposite sides of the vehicle for lending flexibility to the adjustment of tools respectively moved by said arrangements.

Still a further object is the provision in a tractor of a housing portion enclosing one or more of the fluid-operated arrangements or motors.

For other objects and for a better understanding of the invention reference may be had to the following detailed description taken in connection with the accompanying drawing, in which:

Figure 2 is a view in elevation of the intermediate housing of the tractor with a portion thereof cut away to show a fluid operated device and other parts of the fluid operated arrangement which are used therein;

Figure 3 is an enlarged plan view of the fluid operated device together with its valve mechanism;

Figure 5 is a side elevational view of the fluid operated device looking in the direction opposite to that shown in Figure 2 and with a portion of the valve mechanism broken away for clarity, the view being taken generally along the line 5—5 of Figure 3;

Figure 6 is an unfolded view of the valve mechanism illustrating the flow of fluid therethrough pursuant to causing piston movement in one direction;

Figure 7 is a view similar to that of Figure 6 with the valve mechanism conditioned for directing the flow of fluid (indicated by the arrows) so as to cause the piston to move in the opposite direction;

Figure 8 is an unfolded view of the distributing head in the tractor intermediate housing, with lines illustrating the flow of fluid through the same;

Figure 9 is a sectional view taken along the line 9—9 of Figure 8;

Figure 10 is a sectional view taken along the line 10—10 of Figure 8;

Figure 11 is a fragmentary view in section of the distributing head of Figure 8, showing the bypass valve thereof;

Figure 12 is a view in longitudinal section of the fluid pump and of the constant pressure control mechanism associated therewith;

Figure 13 is a fragmentary sectional view illustrating the control for a by-pass valve of the pump in one of its positions;

Figure 14 is a view similar to Figure 13 illustrating the control in another of its positions;

Figure 15 is an end view of the pump and looking to the right at a plane indicated by the line 15—15 of Figure 12;

Figure 16 is a view showing the location of the pumping chambers and taken along the line 16—16 of Figure 12;

Figure 17 is a transverse sectional view of the pump taken on the line 17—17 of Figure 12;

Figure 18 is a view in elevation of an end plate of the pump device along the line 18—18 of Figure 12; and Figure 19 is a view in cross-section of the intake and outlet passages in a conduit member communicating between the pump and the fluid operated device, taken along the line 19—19 of Figure 12.

Figure 1:
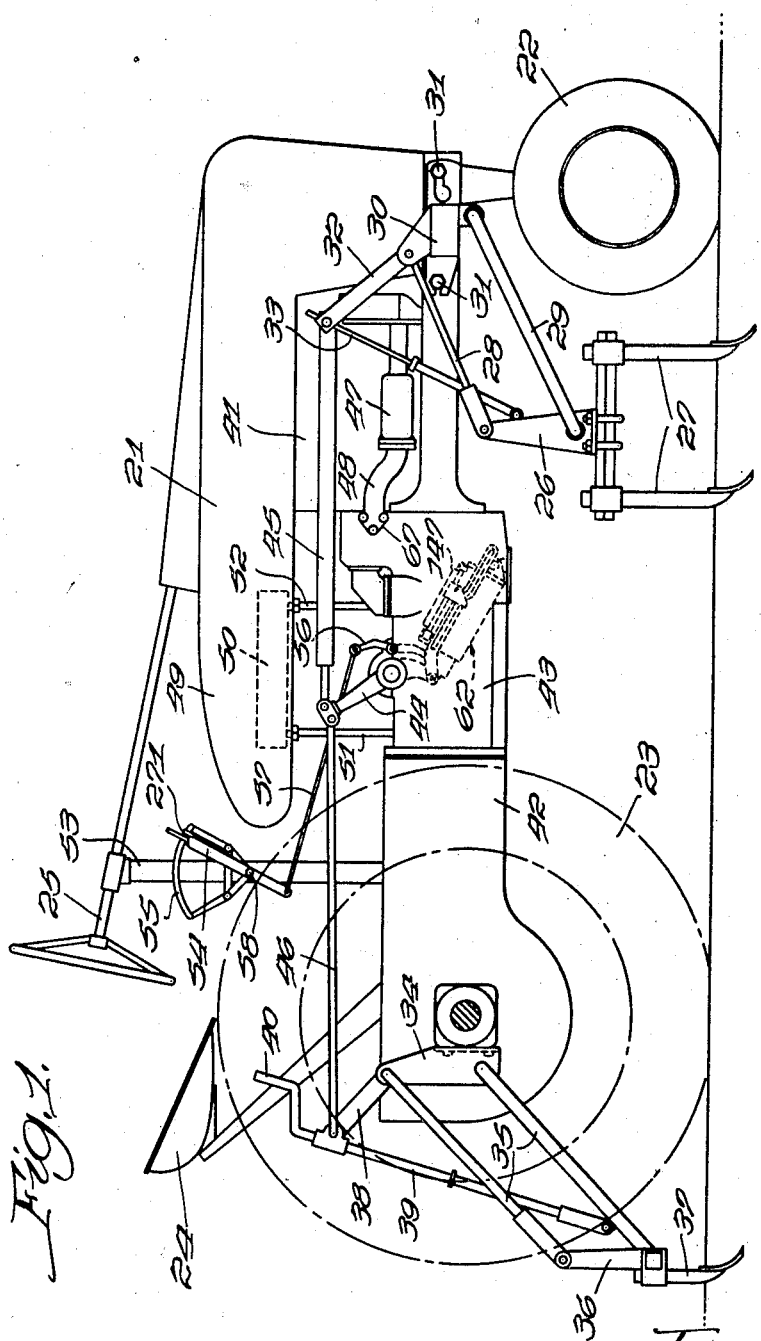
Figure 1 is a view in elevation of a tractor or tool-supporting structure with a working tool connected thereto and with the fluid-operated arrangement of the present invention arranged for moving the working tool.

Referring now to Figure 1, there is shown a tractor or tool-supporting structure 21 having forward dirigible wheels 22 for supporting the forward end of the tractor and traction drive wheels 23 for supporting the rearward portion thereof. Connected with the dirigible wheels 22 and extending from an operator's station 24 on the rearward portion of the tractor is a steering mechanism 25 for controlling the path of movement of the tractor. To the forward portion of the tractor is connected for vertical movement a working tool structure 26 having working tools 27 thereon. The connection of the working tool structure with the tractor is made by means of upper and lower parallel links 28 and 29 connected to a bracket structure 30 secured to the forward portion of the tractor by means of clamping bolts 31. On the bracket structure 30 is a lifting lever 32 pivoted for fore and aft movement and connected to the working tool structure 26 by means of a lift rod 33.

On the rear portion of the tractor is connected a bracket structure 34 to which is connected, by means of parallel links 35, a rear working structure 36 having a working tool 37 thereon. Similarly, there is on the bracket structure 34 on the rear of the tractor a fore and aft pivoted lever 38 connected to the lower parallel link 35 by means of an adjustable lift rod 39 having a handle portion 40 accessible to the operator's station 24. By means of this handle portion 40, an adjustment may be made of the rear working tool structure independently of the forward working tool structure.

The tractor 21 has the usual power plant 41 and a longitudinally extending body portion 42. This body structure 42 includes an intermediate housing 43 in which are mounted parts of the fluid power arrangement to be described more in detail hereinafter. Extending from the housing 43 and pivoted thereon for fore and aft pivotal movement is a lifting arm 44 connected respectively with the pivotable levers 32 and 38 by means of horizontal lift rods 45 and 46. Adapted to be operated by the tractor motor is a fluid pump 47 having communications with the intermediate housing 43 by means of a communicating pipe 48. Within a fuel supply tank 49 there is a fluid reservoir housing 50 arranged for communication with parts within the intermediate housing 43 by vertically extending pipes 51 and 52. On a steering rod supporting post 53 is mounted a control lever 54 manually adjustable along a quadrant 55 for operating a lever 56 pivoted on the intermediate housing 43 and connected inside the housing with the parts of the fluid power arrangement, in a manner brought out hereinafter. The connection of the lever 54 with the lever 56 is made by a rod 57 connected to the lower end of the lever 54. The lever 54 is pivoted at 58 on the quadrant 55.

Referring now particularly to Figure 2, there is shown an enlarged view of the intermediate housing 43 with a portion of the same broken away to show parts of the fluid power arrangement therein. This housing 43 is of sturdy construction since it is a part of the body portion which must withstand the usual strains common to tractors of this type. The lever 44 is pivoted to the upper portion of the housing 43 as indicated at 59 and has a lower end 60 to which is coupled a piston rod 61 of a fluid power or fluid operated arrangement or device 62 mounted within the housing and pivoted to the same as indicated at 63 in an inclined position. The lever 56 is likewise pivoted to the upper portion of the housing 43 as indicated at 64 and has a depending portion 65 which is connected to a longitudinally movable follower element 66 located on the fluid operated device 62, the function of which will be described hereinafter in connction with the description of the fluid operated device itself.

For the sake of compactness, the fluid communication pipes 48 are connected to the housing 43 as indicated at 67 and are in communication with corresponding pipe openings 68 and 69 formed through the housing 43. For further communication of the fluid from the passages 68 and 69, there is a communication block 70 connected to the top part of the body housing 43. Fluid from the reservoir 50 is delivered through the pipe 52 and a coupling 71 to a passage within the block 70 for delivery to the passage 68 and thence to the pump 47. Fluid is returned from the pump to the passage 69 under pressure and thence through the block 70 and a supply hose 72 which communicates with a distributing valve 73. From this distributing valve 73 fluid is delivered under pressure through a hose 74 to the fluid operated device 62. From the fluid operated device 62 the fluid flows through a hose 75 and the distributing valve 73 and thence through the vertical pipe 51 for return to the fluid reservoir 50 in the fuel tank 49.

As the fluid is distributed under pressure to the fluid operated device 62, the arms 44 on the intermediate housing 43 will be adjusted thereby fore and aft, and since the working tool structures on the forward and rearward portions of the tractor are connected to these arms, these working tool structures will be adjusted by the power of this fluid actuated device 62. The amount of movement of the working tools is limited only by the maximum stroke of the piston rod 61 whereby the working tools are moved from one extreme position to another extreme position with respect to the tractor. This movement of the working tool structure is initiated by the manual lever 54 operated from the operator's station 24 although it should be understood that the actual movement of the working tools is done by the power device itself. In a manner to be hereinafter described, the lever 54 can be set at any position on the quadrant 55, and this movement will be reflected in the valve control mechanism associated with the fluid power device 62 so that a corresponding movement of said power device and working tools will be had.

Figure 4:
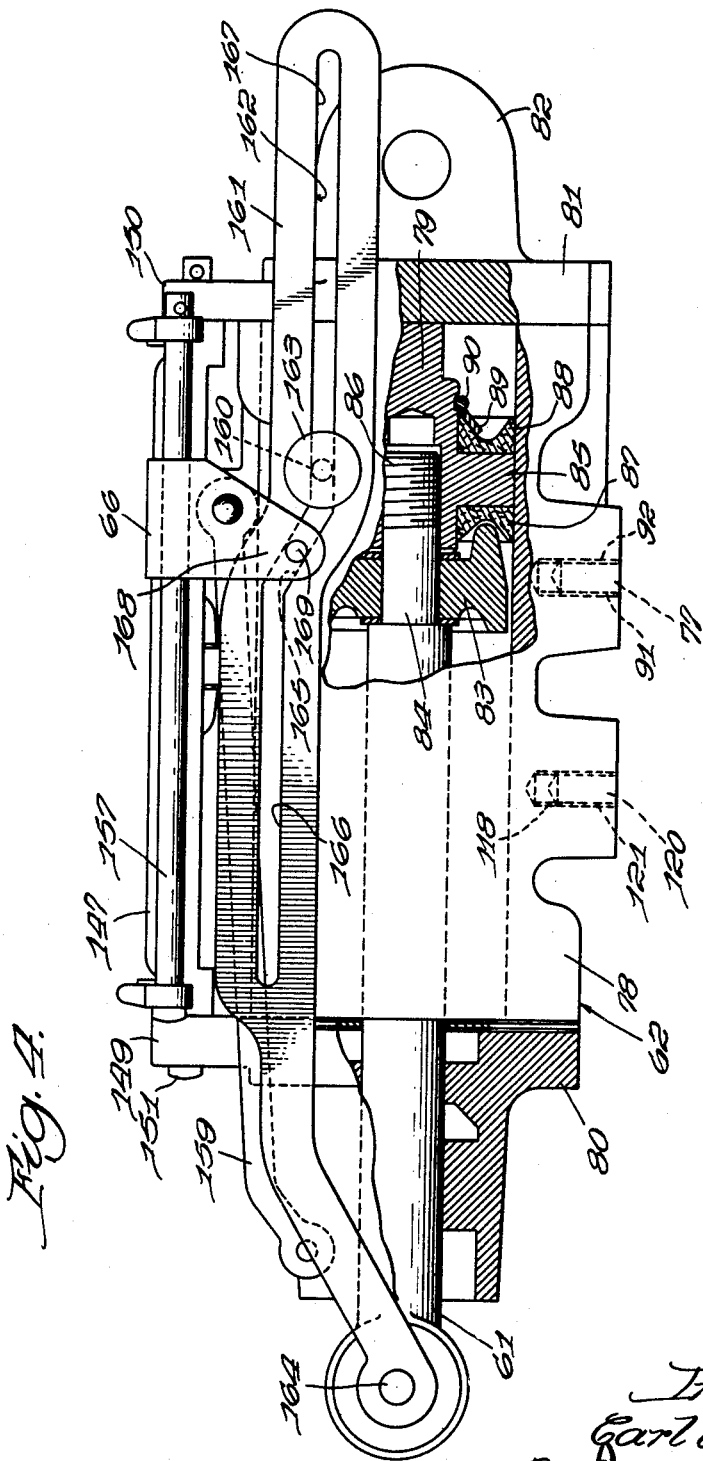
Figure 4 is an enlarged view in elevation of the fluid operated device taken of the same side exposed in Figure 2 but with a portion of its cylinder structure broken away to show the piston within the same.

Referring now particularly to Figures 3, 4, and 5, a description will now be made of the fluid actuated device 62 and of the valve mechanism therefor, and by assuming that fluid is already provided under pressure in the communicating hose coupling 74 for delivery to the fluid operated device 62. The communicating hose coupling 74 connects with the fluid operated device by means of a coupling 76 secured to the device by means of a clamping bolt 77. The fluid operated device includes generally a cylinder housing 78 and a piston structure 79 secured to the inner end of the piston rod 61. The piston rod is slidable through a cylinder head 80 which closes one end of the cylinder structure 78. The opposite end of the cylinder structure 78 has a head member 81 with a lug 82 serving to connect the device with the intermediate housing 43, as previously mentioned, at 63.

The piston structure 79 may be of any known type adapted for double acting cylinder devices, but in the present instance includes a ring 83 which fits over a narrowed portion 84 of the piston rod and is made fast thereto by a main piston element 85 threaded as indicated at 86 to the portion 84. Associated with this main piston element 85 are wiping rings 87 and 88, the former being retained by the ring 83, while the latter is retained by a washer 89 and a ring 90 secured to the main piston element 85. As viewed in Figure 4, the clamping bolt 77 is threaded into a threaded recess 91 directed upwardly into the cylinder structure from the lower edge of the same. Adjacent the threaded recess 91, Figure 6, is a fluid communicating opening 92 into which fluid passes from the hose 74, and thence through a passage 93 to an angle-shaped passage 94 in a valve housing 95 which is adapted to be secured to the cylinder structure 78 with a partition plate 96 secured therebetween. This partition plate 96 has several fluid passing holes arranged for communication between respective other passages, as the passage 94, formed in respective flat faces of the valve housing structure 95 and of the cylinder structure 78. By using the partition plate 96 the difficult task of coring holes within castings is eliminated. The passages may be simply impressed or cast into flat or complementally fitting faces of the structures adapted to be sealpressed together, and the fluid passages themselves are completed on opposite sides of the partition plate 96 by virtue of the same being secured therebetween. Hence, in the manufacture of the power device the necessity for coring of openings in order to provide passages for the fluid has been eliminated. All of this has lessened the cost of a more or less complicated structure and has brought the same within the price range of fluid-operated devices of the more simple type.

Referring now particularly to Figure 6, the fluid on entering the passages 92 and 93 is first communicated to a longitudinally extending cavity or impression 97 in the exposed flat face of the cylinder structure 78. From this impression 97 it may be delivered either through a hole 98 or a hole 99 in the plate 96. Assuming the fluid passes in the direction of the arrows through the hole 98, it comes into communication with the angled impression 94 in the valve housing 95. This valve housing 95 has four valves 100, 101, 102, and 103 within chambers 104, 105, 106, and 107, respectively, of the valve structure 95. Fluid upon leaving the impression 97 passes through the opening 98 in the plate 96 to the valve chamber 105 and past the valve 101, which is open, to the impression 94 on the face of the valve structure 95. From this impression 94 it is delivered through an opening 109 in the plate 96 to a passage 110 in the left-hand or front end of the cylinder structure from which it is discharged into the cylinder structure to act upon the piston 79.

For work to be performed upon the piston 79 there must be a release of fluid on the end of the piston opposite to that against which fluid is impressed for producing a work stroke. This is accomplished by fluid passing from the opposite end of the cylinder structure, corresponding to said opposite end of the piston, through a passage 111 thereof, thence through an opening 112 in the plate 96 and for delivery to an angled impression 113 on the face of the valve structure 95. From this impression 113, the fluid passes the valve 102 for delivery to an intermediate T-shaped impression 114 in the valve structure 95. From this T-shaped impression 114 fluid passes through an opening 115 in the plate 96 to an impression 116 on the face of the cylinder structure, downwardly through a vertical passage 117 to an outlet port 118. This outlet port 118 is in communication with a hose coupling 119 secured to the cylinder structure by means of a clamping bolt 120 seated in an opening 121, Figures 4 and 5. From the opening 118 fluid then passes through the coupling 119 to the hose connection 75 to be delivered to the distributing valve 73 for return to the fluid reservoir 50. As viewed in Figure 6, it will be noted that upon the introduction of fluid to the cylinder through the opening 110 and the exhaust of fluid from the cylinder through the opening 111, the piston 79 will be moved to the right or rearwardly, or, as viewed in Figures 4 and 1, will be moved to the left or rearwardly to rock the arm 44 for raising the working tools.

Should the piston 79 be projected forwardly or to the left, as viewed in Figure 6, when a lowering of the working tools is desired, the fluid will take a path through the valve structure as now to be described with reference to Figure 7. To effect movement of the piston to the left, referring to Figure 7, the fluid which always enters the vertically extending opening 92 will be delivered through the long impression 97 to the opening 99 in the plate 96, instead of to the opening 98 of the plate 96, and then through the valve chamber 107, and past the valve 103 to the angled impression 113 for delivery through the opening 112 in the plate 96 to the passage 111 in the cylinder structure 78. From this passage 111 it is discharged into the cylinder structure to act upon the piston for effecting movement of the same to the left. Simultaneously with movement of the piston in this direction fluid leaves the cylinder structure from the opposite end of the piston and does so through the opening 110, opening 109 in the plate 96, impression 94, piston valve 100, valve chamber 104, an opening 122 in the plate 96, and thence into an axially extending impression 123 in the cylinder structure 78 from which it passes through an opening 124 in the plate 96 to the T-shaped impression 114 in the valve structure 95. From the T-shaped impression 114 the fluid discharge continues through the opening 115 to the impression 116 in the valve structure and thence downwardly through vertical openings 117 and 118 to the return hose connection 75. It should now be apparent that valve mechanism has been provided for controlling the flow of fluid for moving the piston 79 in either of its reciprocal directions within the cylinder 78.

Referring now to Figure 5, a description of the valve arrangements 100 to 103 will be made with particular reference to the arrangement 100, since these four valve arrangements are identical. The valve 100 is cylindrical and is tapered on one end, as indicated at 125, for contact with a conical seat 126 formed in the valve housing 95. For a portion of its length, adjacently to its tapered portion 125, the valve is of smaller diameter than the valve casing bore 104 in which it is reciprocal, to provide a passage for fluid around this portion of the valve upon the same being opened by the breaking of its contact with the seat portion 126. When the valve is closed, this smaller diameter portion of the valve, together with the valve casing bore 104, provides an annular fluid chamber 127 about the valve 100, and this chamber is in communication with certain of the holes as 98 and 109 formed in the plate 96.

Within the valve 100 there is a secondary ball valve 128 normally retained against its seat 129 by a spring-pressed plunger 130 to the lower end of which is connected a compression spring 131 which reacts against a plug 132. This secondary valve is so designed in the valve 100 in order to provide an arrangement whereby the main valve 100 may be opened with the least expenditure of energy, thereby making possible the use of operating devices of minimum dimension for operating the valve. A hole 134 in the valve provides communication between the chamber 127 and a chamber 133 bounded in part by the valve seat 129. The chamber 133 has a narrow opening 135 in the upper part of the valve 100 through which fluid is transmittable to the upper part of the fluid-containing valve bore 104. Through this opening 135 there extends a vertical operating rod 136 which contacts the ball 128 and which, when pressed downwardly, serves to unseat the ball 128 from its contact 129 on the valve 100. As the ball 128 is unseated, fluid under pressure will at first pass upwardly through the narrow opening 135 until sufficient back pressure is built up above the main valve 100 to materially contribute to the lowering of the same for breaking the contact of the tapered portion 125 with the valve seat 126. The downwardly displaced ball forces the plunger 130 downwardly, first an initial amount to bring the upper side of an oversize opening 137ᵃ extending diametrically through the plunger into contact wth a pin 137ᵇ traversing said opening and having its ends fastened in the valve member 100. Then, after the building up of said back pressure above the valve member tending to slide it downwardly, comparatively little additional force applied downwardly through the rod 136, ball 128, plunger 130, and the cross-pin 137ᵇ is necessary to cause the valve member 100 to move downwardly to unseat it at 126 and thus provide direct communication between the annular chamber and the upper part of the valve casing bore 104.

As a means for operating the rods 136 there are provided plungers 139 reciprocally carried in a sealing block 140 through which the rod 136 extends. This sealing block 140 is located in the upper end of the valve casing bore 104 and bears against a sealing element 141. Pairs of the sealing blocks 140 are retained in place by respective plates 142 secured to the upper part of the valve housing by means of screws 143. The plungers 139 are normally retained vertically upwardly by the action of the spring 131. The valves are arranged in pairs and from them there extend two of the control plungers 139 spaced axially of the cylinder structure 78 and accessible at the top of the valve structure 95. Each pair of plungers is controlled by a lever 144 pivoted on a pin 145 supported by a lug 146 mounted on the plate 142. Each lever is alined longitudinally with the tops of its respective plungers 139 and as the same is rocked about its pivot pin 145 either one or the other of the two plungers 139 will be depressed against the action of the associated compression spring 131.

Mounted on the upper side of the cylinder structure 78 for pivotal movement about an axis parallel with that of said structure is a main operating lever 147, Figures 1, 2, and 3, having a laterally extending arm 148. The pivotal connection is made to lugs 149 and 150 located respectively on the head members 80 and 81 of the cylinder structure, and by means of pins 151 and 152. This pivoted operating member 147 therefore spans a substantial distance lengthwise of the cylinder structure.

The arm 148 has in its outer end a horizontally extending slot 153 adapted to receive a connecting element 154 having ball-shaped ends 155 for making universal joint connections respectively with the inner ends of the levers 144, the ball ends 155 being inserted within recesses 156 of the levers. As the lever 147 is rocked, the outer end of its arm 148 will move either upwardly or downwardly for pivoting the levers 144. If the arm 148 moves downwardly, the plungers 139 on the inner sides of the pins 145 will be depressed, whereas if the arm 148 is moved upwardly the plungers 139 at the outer sides of the pins 145 will be depressed. In either movement of the arm 148 one plunger 139 of each pair will be moved.

On the pivoting operating structures 147 is a longitudinally extending rod 157, Figures 1, 2, 3, and 4, on which is slidable the adjustable stop or cam follower member 66 connected to the lower end of the lever 56 by means of a connecting link 159. This link 159 can thus be operated by the lever 56 to adjust the follower 66 along the rod 157, the lever 56 being connected to the manual adjustable lever 54. It will thus be apparent that movement of this follower 66 will be corresponding in amount to the amount of movement of the lever 54 over the quadrant 55.

Projecting laterally from the cylinder structure 78 is a guide pin 160 on which is supported the free end of an elongated cam 161 having a cam slot 162 through which the pin 160 extends. The guide pin 160 has a flared outer portion 163 to positively hold the cam 161 against lateral deflection. The back end of the cam 161 is connected to the piston rod 61 as indicated at 164 whereby it will be movable with the piston rod and piston 79. The cam slot 162 has an intermediate neutral portion 165 disposed angularly with respect to offset parallel portions 166 and 167. It will be observed that the cam follower element 66 is folded about the rod 157 to be adjustably slidable thereon and has two opposed depending portions 168 which straddle the cam 161 to support a pin 169 in the cam slot 162. This pin 169 is arranged to ride in the cam slot 162 so that as the manually controlled lever 54 is pivoted to adjust the cam follower 66 lengthwise of the rod 157, the pivoted structure or lever 147 will be pivoted on the pivot pins 151 and 152 to cause up or down movement of the arm 148, this being effected by the reaction of the pin 169 against the edges of the cam slot 162.

The normal position of the follower 66 is that shown in Figure 4 but as it is adjusted rearwardly or to the left the pin 169 will ride upwardly on the inclined neutral portion 165 to effect downward movement of the arm 148 so that the two inner plungers 139, Figure 5, will be operated. Should the operator move the follower so that the pin 169 moves downwardly along the neutral portion 165, the upper edge of the cam slot will pivot the structure 147 so that the arm 148 moves upwardly thereby operating the outer plungers 139. As this takes place the operation of the piston will begin and will not stop until the cam 161 has been moved so that the pin 169 is again in the center of the neutral or inclined portion 165 of the slot. If the cam follower 66 is moved to the left as viewed in Figure 4, the piston will move to the left until the portion 165 of the slot has returned the cam follower and the pivoted structure 147 to the neutral position. Similarly, if the cam follower 66 is moved to the right, the piston 79 would move to the right, assuming that it had not already been completely returned to the right side of the cylinder structure as viewed in Figure 4.

As the inner plungers 139 are depressed, the valves 101 and 102 are opened as viewed in Figure 6, and fluid automatically flows as traced in Figure 6 to the port 110 to act against the piston 79 to the right, or to the left as viewed in Figure 4. When the outer valves 100 and 103 are depressed, the flow of fluid is as illustrated in Figure 7, that is, to the piston rod end of the cylinder structure to move the piston 79 to the left, or to the right as viewed in Figure 4.

The valve balls 128, in addition to serving as an initial opening means for the valve means as 100, also cooperate with the valve members 125 in providing flow rate stages in which such valve means may be operated and corresponding speed stages in which the force transmitter 79, Figure 4, and the part 37, Figure 1, are adjustable. When the valve means is operated in an initial stage in which the valve stem 136 thereof is depressed far enough for unseating only the associated ball 128, only a small maximum amount of fluid can flow past the valve means for introduction into and exhaust from respective ends of the cylinder to incur relatively slow movement of the piston or force transmitter 79 and the tool or adjustable part 37. In certain installations such slight or micrometer adjustment of the tool is highly desirable, and in such installations it is also sometimes desirable to cause the tool to move at a relatively high rate of speed. With the present apparatus, the higher rate of movement is obtainable at will simply by moving the manual control lever to advance the cam follower 66, Figure 4, in the direction the cam member 161 is being moved by the force transmitter 79 but at a greater speed, whereby the diagonal portion of the cam slot 162 will be effective for depressing the valve stems 136 of the already opened valves more distantly for likewise depressing the balls 128, the plungers 130, the pins 137ᵇ, which will be thus ultimately engaged by the upper sides of the oversize openings 137ᵃ, and hence the valve members 125 for unseating said members 125 from their seats 126 to place the valves in their second operating stage having the much increased flow rate. The flow rate in either range is variable according to the speed at which the manual control member is moved. For instance, while the apparatus is operating with only the balls 128 unseated, the distance they are unseated may be varied by slightly accelerating or decelerating the speed of the manually controlled finger grip lever 54. The fluid flow speed and hence the piston speed may be kept constant by moving the manual control lever 54 at such uniform speed that keeps the pin 169, Figure 4, in fixed relation with the diagonal cam slot portion 165 in which it is ridable, that is, to move the pin 169 in the same direction and at the same speed at which the motor piston 79 moves the cam member 161. If the manual control lever is decelerated from this uniform speed, the cam member 161 will gain upon the pin 169 to allow the balls 128 to approach their seats, throttling the fuel flow and decreasing the piston speed. If the manual control lever is stopped, the neutral point of the diagonal slot in the cam member 161 will immediately overtake the pin 169 to seat the balls 128 and thus stop piston movement. Should the manual control lever be accelerated from said uniform speed, the pin 169 would be advanced with respect to the advancing diagonal cam slot portion 165 to farther unseat the balls 128 from their seats 129 to increase fluid flow and piston speed. Thus, within a speed range variable from zero to a maximum determined by the flow capacity of the valve parts 128—129, the manual control lever 54 is manipulatable at slow speeds to select slow speeds of piston adjustment. This slow speed of the piston is so coordinated with the speed of the lever 54 as to create the sensation that the parts moved by the piston are moved effortlessly by said lever. If the lever is accelerated, decelerated, or stopped, a like instantaneous response is incurred by the piston and the parts it drives. Because of the small flow capacity of the valve parts 128—129, the just explained force transmitter or piston movement control is tantamount to a vernier adjustment.

The speed at which the manual control lever 54 is adjusted in either direction also controls the speed and direction of the motor piston during operation of the apparatus in the high speed range, that is, while valve members 125, Figure 4, are unseated from their seats 126. The upper limit of said range is determined by the flow capacity of the valve parts 125—126 and the delivery capacity of the fluid source, and the speed within said range is selected by adjusting the distance the part 125 is unseated in the manner described above with respect to the balls 128. The control lever of course must be moved more rapidly while controlling the higher piston speeds. So long as this higher speed range limit is not exceeded the piston movement will be instantaneously responsive to speed and direction of the manual control lever.

It is also important to note that the speed control is ideally responsive to the muscular reflexes of an operator since it is natural for him to move the control lever faster or slower as faster or slower movement of the motor piston is desired. This operating characteristic of the apparatus is further highly desirable when making micrometric adjustments when the natural inclination of an operator is to move the control lever with a degree of slowness corresponding to the exactness sought. Greater exactness is attainable in setting the piston when it is moved slowly.

Referring now to Figures 2 and 8 to 11, inclusive, there is shown the distributing valve arrangement to which fluid is delivered from the fluid supply pump source under pressure and distributed for supplying fluid to two different fluid-operated devices, only one of which is shown. In these tractor-mounted arrangements it is customary to have implements or working tools located at opposite sides of the tractors and it is desirous that these working tools be operable independently of each other. For this purpose there are often provided two different cylinder devices for actuating the different tools. As viewed in Figure 8, it will be noted that there are two high pressure openings 170 and 171. The pressure opening 170 is for delivering fluid to the fluid-operating device 62, whereas the pressure opening 171 is for delivering fluid to a second fluid-operated device, not shown, for operating tools on the other side of the tractor. Fluid is supplied to this distributing valve and to this high pressure opening through a vertically extending opening or duct 172. Fluid is delivered from the pump source to the duct 172 through an attached coupling 173 which connects the supply hose 72 to the distributing valve 73. The views in Figure 8 show the distributing valve opened to illustrate the ducts and openings in its two parts 174 and 175, these views being elevational views of the individual parts 174 and 175 of which the latter is shown upside down in a position adapting the parts to be folded up together to form the composite distributing valve 73.

Fluid from the low pressure side of the fluid operated device or from the return hose coupling 75 is returned to the distributing device through openings 176 and 177. The opening 177 is utilized for adjusting working tools at the side of the tractor opposite to that shown in Figure 1. From this opening 177 the returning fluid will continue through a passage 178 in the distributing valve part 175 and thence upwardly through the pipe 51 to the reservoir 50.

Normally, fluid under pressure is delivered to the openings 170 and 171 through a round opening 179 and a duct 180 (in the form of a groove in the flat face of the part 174) which extends between the two openings 170 and 171. The path of fluid through the distributing valve is that taken by the arrows 181. When fluid is not being delivered to the fluid-operated device 62, the pressure in the duct 172 reaches sufficient magnitude that the fluid flows vertically through said duct 172 to an opening 182 in the part 175 to react against and open a by-pass ball valve 183 which is normally retained against its seat 184 by a compression spring 185 and a washer 186. Such fluid that by-passes this ball valve 82 will be delivered through a duct 187 to the duct 178 and from there returned to the fluid reservoir. It should be particularly apparent at this time that fluid is kept under pressure within the high pressure passages 172 and 180 at all times and that from these passages fluid pressure is extended to the fluid operated device whereby fluid is provided under pressure at a location within the cylinder structure itself and within a short distance from the openings 110 and 111 at the ends of the cylinder. In other words, fluid under pressure is always on tap for the fluid operated devices. This adds to the sensitivity of the fluid operated device and makes possible the use of the same for delicate adjustment of the working tools. The distributing valve parts 174 and 175 are held together by bolts 188 shown in section in Figure 8.

Description will now be made of the fluid pump, Figures 13 to 19, and the automatic control of the fluid for the purpose of maintaining fluid under constant pressure within the system. A driving gear 190, driven from a part of the tractor power plant as a valve operating cam shaft, drives a pinion gear 191 wedged on a pump shaft 192. Said pump shaft is enclosed for a portion of its length by a hollow casting 193 forming part of the pump casing and on the outer end of which there is a bearing support 194 for a ball bearing unit 195 for the shaft 192. Connected to the casting 193 is a second pump casing casting 196 which supports a ball bearing race 197 fitted in the casting about the pump shaft and at an angle thereto. Associated with this race 197 are a series of ball bearings 198 and a second race 199 having hemispherical portions 200 thereon for connecting hollow cylindrical pump plungers 201. The connecting portions 200 on the race 199 also have respective interior hemispherical bearing surfaces 202 within and against which head portions 203 of connecting pins 204 are slidingly seated for universal movement. These connecting portions 200 are also provided with respective end or crown openings 205 through which the pins 204 extend for respective connection with the plungers 201.

The plungers 201, of which there are four distributed equidistantly circumferentially about the drive shaft 192, are seated within the bores 206 of cast cylinders 207. On the back end of the shaft 192 (the end disposed to the left as viewed in Figure 14) there is a threaded portion 208 to which a disk-shaped plate 209 is rotatively fixed. The cylinders are fixed to this plate 209 as well as a generally annular casting 210 having four axial channels 211 respectively communicating with the cylinder bores 206 through openings 212 in said plate. As the parts connected to the shaft 192 are rotated, the plungers 201 will be actuated by the inclined ball bearing unit and springs 213 to reciprocate in their cylinders for alternately sucking oil into the passages 211 and forcing it from said passages.

At the back end of the pump there is another casing casting 214 to which is bolted, by means of bolts 215, a stationary cylindrical valve member 216. This valve member 216 has axial intake and discharge ducts 217 and 218, and the cylindrical exterior of said valve member has a close sliding fit with the cylindrical center bore through the channelled casting 210, facilitating rotation of the latter thereabout while maintaining a fluid seal contact therewith. While the back ends of the ducts 211 are in registry with a transverse port 219 which communicates with the axial intake duct 217 (see Figure 17) their respectively associated plungers 201 will be receding axially forwardly under the force of their springs 213 as permitted by the inclined ball bearing unit to suck oil into such ducts 211, and subsequently when the back ends of the filled ducts 211 reach registry with a transverse port 220 which communicates with the discharge duct 218, their respectively associated plungers will be moving rearwardly under force exerted by the inclined ball bearing unit to force the oil from said filled ducts 211 into the discharge duct 218. Since the intake slot 219 is broader than the diametrically opposite discharge slot 220, an additional slot 221 is provided on the side of the member 216 with the narrower slot 220 so the frictional drag of the rotating casting 210 thereon is properly balanced.

To the casting 214 is connected another casting 222 and a plate 223. The connection of the casting 222 and the plate 223 with the casting 214 is established by bolts 224.

As viewed in Figure 15, the communicating conduit 48 is fastened to the plate 223 by cap screws 225. This conduit 48 has within the same, Figures 15 and 19, an intake passage 226 and a high-pressure discharge passage 227 which communicate respectively with the passages 68 and 69 in the intermediate housing 43; see Figure 2. Fluid from the intake passage 226 is delivered through a hole (not shown) in the plate 223 and a hole 228a (shown only in Figure 18 since it is behind a valve 230a in Figure 12) in the casting 214 and an opening 228 in the casting 214 to the above described axial intake duct 217 of the fixed cylindrical valve member 216. Thus, fluid is delivered to the pump from the reservoir through the vertical conduit 52, Figures 1 and 2, coupling members 71 and 70, intermediate housing passage 68, duct 226 in conduit 48, Figures 2 and 15, said holes (not shown) in the plate 222 and the casting 214, said opening 228 in the casting 214, and said intake duct 217. During the suction of the plungers 201, fluid will be taken into the cylinder bores 206. As the suction stroke is completed and as the plungers 201 move rearwardly against the action of the springs 213, oil is forced out thereby under pressure through the slot 220 and the passage 218 in the cylindrical valve member 216 to a passageway 230 in the casting 214. If the passageway 230 is filled and there is a demand for the fluid, this fluid under pressure will pass through a valve 230a in the casting 222 by displacing a ball 231 thereof from its seat 232 against the force of a spring 234. The fluid thus passed by the valve is conducted through an opening 233 in the plate 223 to the high pressure discharge duct 227 in the conduit 48 for ultimate delivery to the fluid operated motor or device 62.

Should there be no demand for the fluid by the fluid operated device or should a drop in pressure in the duct 227 occur for any other reason, it is desirable that the fluid entering the passage 230 be directly returned to the pump, that is, without passing through the valve 230a. This contingency is provided for by a valve 234a including a rotary cylindrical valve member 235 fastened to a shaft 236 which extends through the casing parts 223, 222, 214, and 196. Connection of the valve member 235 with the shaft 236 is made by means of a pin 237. Composition sealing rings 238 prevent leakage of fluid through the journals of the shaft 236 in the casing parts 223, 214, and 196.

Driving force for the shaft 236 is obtained through a gear 240 on the pump drive shaft 192. Said gear 240 is caused to rotate with the shaft by means of friction plates 241 and 242 located on opposite sides of the pinion and rotatively fixed upon said shaft. The friction plate 242 is secured in place by a thrust ring 243. The gear 240 and the friction plate 241 are pressed toward the stop 243 by a spring 245 pressing axially against an axially slidable collar 244 keyed to the shaft 191 at 248. Said spring 245 reacts against a washer 246 seated against a shoulder 247 of the shaft 192. It should now be apparent that the gear 240 is impositively held against rotative movement on the shaft by friction means which can be overcome by locking of its cooperating gear 250 keyed to the shaft 236 by a pin 251. Except when the shaft 236 is locked by means to be hereinafter described, the gear 240 will rotate with the shaft 192.

The open-ended hollow rotary member 235 of the valve 234a has diametrically opposite side wall holes 252, Figure 14. When either of the holes 252 is alined with a passage 254 in the casting 222, Figures 12 and 18, fluid is delivered through the alined holes to said passage and from there to the low pressure intake passages 228 and 217 for the pump.

Escapement means for controlling the valve 234a includes crossed elements 255 and 256 which are rigidly secured to the back end of the shaft 236 with the element 255 spaced from the face of the plate 223 by the element 256. These crossed elements 255 and 256 are rigid with a collar portion 257 which is secured to the shaft 236 by a pin 258. Additional means, cooperative with the crossed members 255 and 256, for controlling the valve 234a includes and is assembled about a shaft 260, Figures 13 and 14, journaled at 264 in the plate 223 and arranged coaxially within a chamber 259 formed within the castings 222 and 214. A spring 261 presses against a washer 262 on the shaft to urge the latter axially forwardly to the position shown in Figure 14. Leakage from the chamber 259 through the journal 264 is prevented by a rubber sealing element 265.

The chamber 259 is in communication with the high-pressure passage 233 through a passage 266, Figures 12, 13, and 18. When there is sufficient pressure on tap, the rod 260 is forced rearwardly or to the left, as seen in Figure 14, by the fluid pressure so as to assume the position shown in Figure 13. In effecting this rearward movement of the shaft or rod 264, the fluid leaks forwardly between the periphery of the washer 262 and the adjacent cylindrical wall portion of the chamber 259 to press rearwardly upon the forward end of the rod 260 and when this force is sufficient it overcomes that of the spring 261. During this rearward movement of said shaft, a collar 267 having a circular flange 268 is moved therewith from the position shown in Figure 14 to the position shown in Figure 13 where the flange 268 is away from the face of the plate 223. With the flange 268 away from said plate the cross elements 255 and 256 will be permitted to rotate clockwise, as viewed in Figure 15, through 90° (when one end of the cross member 255 strikes the flange 268) as driven by the pump shaft gear 240 to throw the rotary valve member 235 so one of its openings 252 is in alinement with the passage 254 so that fluid will by-pass the valve 230a while circulating through the pump.

When pressure within the chamber 259 is diminished because of the introduction of fluid into the fluid actuated device 62 for driving the same, the flange 268 and the rod 260 will move inwardly or forwardly to the position shown in Figure 14 because the spring 261 will predominate over the correspondingly diminished fluid pressure on the front end of the rod 260. This will remove the flange 268 from abutment with the cross member 255 to permit rotation of the shaft 236 through an additional 90° whereupon further rotation is precluded by an end of the cross member 256 striking the flange 268. Upon completion of this rotary movement, the port openings 252 in the rotary valve member 235 are both out of alinement with the channel 254 in the casting 222 and the by-passing of fluid around the valve 230a is discontinued. Since the fluid cannot leave the passage 230 by way of the passage 254 in the casting 222, it will necessarily seek its way past the valve ball 231 to supply fluid under pressure to the high pressure duct 227 for delivery to the fluid pressure actuated device, and, as explained hereinabove, provides pressure on the valve 101 within the cylinder structure whereby fluid under pressure is continuously provided near to the point where it is to expend work energy.

While the shaft 236 is held against rotation by either of the cross members 255 or 256 abutting with the flange 268, the pinion 240 is likewise held while the pump drive shaft 192 and the piston members 241 and 242 rotate relatively thereto, but as soon as the shaft 236 is permitted to rotate due to axial movement of the washer 268 from abutting with a cross member 255 or 256, the gear 240 and hence the gear 250 and the shaft 236 are promptly rotated from the shaft 192 through a succeeding 90° until the other member 255 or 256 abuts the washer in its new axial position. When the fluid-pressure actuated device 62 comes to rest, the pressure in the duct 227 increases to result in outward projection of the washer to permit rotation of the valve member 235 to bring one of its holes 252 into registry with the by-pass channel 254 whereupon the outer cross member 255 abuts the washer 268, and upon introduction of fluid into the device 62 for driving the same the pressure in the channel 227 drops to allow inward movement of the washer 268 and a concomitant additional 90° rotation of the valve member into position for stopping such by-pass and where its rotation is stopped by abutment of the member 256 with the washer 268. Thus, the valve member 235 rotates 90° each time the fluid-pressure actuated device starts and each time it stops, the member 255 abutting with the washer 268 to stop rotation of the valve member 235 in by-passing position when the fluid-pressure actuated device is at rest and the cross member 256 abutting with the washer 268 to stop rotation of said valve member in non-by-passing position while fluid is being delivered to said device for driving the same.

Connecting the pump casing castings 196 and 214, there is a cylindrical pressed steel housing member 269. Lateral and axial thrust of the shaft 192 and of the annular channelled casting 210 carried on its back end is taken up by a ball and race thrust bearing means 270 provided in the casting 214.

Associated on the quadrant 55 and pivoted at 58 is a gauge lever 271. This lever is such that it can be moved over the quadrant and selectively set thereon. Should the working tool be adjusted in its working position and later the same be raised to a position of transport on the tractor, said tool can be returned precisely to the said working position by returning the control lever to its initial position beside the lever 271. Thus, the lever 271 serves as a telltale stop against which the lever 54 can be set.

The present apparatus makes expedient use of fluid as a power transmitting medium for performing the actual work in manipulating and adjusting cumbersome or inaccessible parts or the like under remote manual supervision. Said apparatus is especially adapted for power control of the working tools on a tractor. The design and combination of the parts utilize high pressure fluid in a manner causing the remotely controlled tools or the like to move substantially simultaneously with and precisely in accordance with the movement of the manual lever 54. Any delay of movement between the manual lever 54 and the working tool is practically imperceptible. In other words, the movement of the working tool is as instantaneous as if a hand-operated adjusting lever were directly connected therewith.

Another important advantage of the present fluid control is its automatic restoration of the force transmitter 79 to any position to which it has been set, should it drift from such position because of fluid leakage at some point in the system as along the cylinder wall from one side of the force transmitter to the other. Fortuitous drifting of the force transmitter in either direction will incur a movement of the diagonal cam slot 165 relatively to the pin 169 therein for setting the valve means to reestablish the fluid distribution in the cylinder and thus correct the force transmitter setting. Automatic corrections of this kind will occur at intervals determined by the speed at which an impairment or imperfection of the system may allow drifting of the force transmitter.

While I have shown and described but a single preferred embodiment, it should be understood that many changes may be made in the construction, details and arrangement of the parts without departing from the spirit and scope of the present invention or sacrificing all of the advantages thereof.

What is claimed is:

1. In a fluid arrangement, a piston, a cylinder housing about the piston having port openings at the opposite ends of the piston, reversible valve mechanism associated with the cylinder housing for controlling the direction of flow of fluid through the port openings, and means for operating said valve mechanism comprising an operating structure pivotable on the housing from a neutral position to positions in which it sets the valve mechanism to cause the flow of fluid in respectively opposite directions, an element for imparting the pivotal movement thereto and mounted on said structure for adjustment thereon in parallelism with the pivotal axis thereof, a cam connected to the piston to be movable therewith, said cam being reactive on said element to displace the same for pivoting the pivotal structure from the neutral position to selected of the other positions incident to manual adjustment of said element axially of said structure, and said cam also being reactive on said element to bring said structure to its neutral position pursuant to the ensuing movement of the piston, whereby the piston will be automatically brought to a stop corresponding to the manual adjustment of the element axially of the pivotable structure.

2. In a fluid arrangement, a piston, a cylinder housing about the piston having port openings at opposite ends of the piston, fluid passages in the cylinder housing for the delivery to and return of fluid from the respective opposite sides of the piston, a pair of alternately operated valves associated with each passage, a common valve operating structure pivotally mounted on the cylinder housing for pivotal movement from a neutral position wherein it incurs setting of the valves to arrest piston movement to a position setting the valves to incur piston movement, a manually operable longitudinally adjustable member slidably mounted on the pivotable operating structure, a member with a cam surface having a neutral position and connected to the piston to be moved by the same and arranged to extend longitudinally along the cylinder housing to coact with the adjustable member whereby as the adjustable member is manually operated the same will be moved along the cam surface from its neutral position for pivoting the operating structure from its neutral position to initiate piston movement, and the cam surface of said member being so profiled as to return the valve operating structure to the piston arresting position during the ensuing movement of the piston.

3. In a fluid power arrangement, a double acting fluid operated device including a piston and a cylinder structure, reversible valve mechanism carried by the cylinder structure, said valve mechanism including two pairs of axially operable valves, plungers for operating said valves projecting from the same, a mechanism lever pivoted on the valve mechanism for each pair of valves, a main operating lever pivoted on the cylinder structure for operating the mechanism levers, an adjustable slide on the main lever, manually adjustable means for operating the adjustable slide for positioning the same on the operating lever, means associated with the piston against which the slide reacts to operate the main lever and the valve mechanism and serving to return the levers and the valve mechanism to their neutral condition as the piston moves an amount predetermined by the setting of the adjustable slide.

4. In a mechanism for adjusting a part that is adjustable in opposite directions relatively to a supporting structure therefor, the combination of a fluid-actuated motor including a vibratory force transmitter operably connected with said part and operable responsively to respective applications of pressure fluid thereto to cause movement of said force transmitter and hence of said adjustable part in respective opposite directions, valve means including an adjusting element adjustable in opposite direction from a neutral position to condition the valve means for subjecting said motor to respective applications of pressure fluid, and valve control means comprising cam means counterparts each independently movable in parallelism with the line of vibratory motion of the force transmitter, a first of said counterparts having a slot having laterally offset end portions substantially parallel with said line of vibratory motion and an intermediate diagonal portion interposed between said end portions, the second of said counterparts having a slider portion disposed within said slot where it is cooperable with the intermediate slot portion to cause projection of one of said counterparts laterally of said line incident to relative movement of said counterparts in parallelism with said line, said one counterpart being operably connected with the valve means adjusting element and occupying a neutral position laterally of said line corresponding to the neutral adjustment of said element when said slider portion is at an intermediate section of the diagonal slot portion, said one counterpart also being selectively settable along said line relatively to said element for displacing said slide portion into either of the slot end portions to accordingly adjust said element for imposing upon the motor a fluid subjection causing movement of the force transmitter in the direction said one counterpart is set along said line, and the other of said counterparts being connected for movement along said line with the force transmitter relatively to said valve adjusting element and being thus operable to reestablish said slider portion in the intermediate slot section for conditioning the valve means to stop the motor when the force transmitter has moved a distance corresponding to the setting of the one counterpart.

5. In a compact control structure for a reciprocating fluid-actuated motor, valve means for controlling the flow of actuating fluid for the motor and disposed upon a side thereof, a valve-operating lever extending across and in close proximity to an adjacent side of the motor from the one side to the side opposite thereto, said lever being mounted for pivotal movement about an axis directed axially of the motor and including an axially extending guide means upon the end at said opposite side, means operably connecting the opposite end of the lever with the valve means to cause operation of the valve means in accordance with pivotal movement of said lever, and means for effecting pivotal movement of said lever comprising relatively movable counterparts upon said opposite side of the motor and of which one is manually adjustable along said guide means while reacting upon the other counterpart to pivot the lever in one direction, and means driven by the motor to move the other counterpart for reacting upon the one counterpart to pivot the lever in the opposite direction.

6. In a compact control structure for a reciprocating fluid-actuated motor, valve means upon said motor for controlling the flow of actuating fluid therefor, an operating lever pivotable to control said valve means, said lever extending across and in close proximity with a side of said motor transversely of the motor axis and connected with the motor casing for pivoting about an axis generally parallel with the motor axis, and lever-pivoting means at an adjacent side of the motor and at an end of the lever, said lever-pivoting means comprising counterparts of which one is driven by the motor along a predetermined path and of which the other is connected with said end of the lever for manual adjustment along said path and consequently displaceable laterally thereof by reaction upon the one counterpart to pivot said lever in one direction, and the motor-driven counterpart being operable when driven by the motor to restore the other counterpart from its lateral displacement and pivot the lever in the opposite direction.

7. In a fluid power transmitting and control apparatus; a fluid-driven motor including a chamber and a work member driven oppositely in such chamber by the introduction of pressure fluid into such chamber on respectively opposite sides of said work member; reversible valve mechanism for controlling such introduction of fluid into the motor chamber; and operating means for operating said valve mechanism, comprising a pivotable structure associated with said valve mechanism and pivotable from a neutral position to alternative positions in which it sets the valve mechanism to selectively cause the flow of fluid to such sides of the work member, a first cam means counterpart on said pivotable structure for imparting the pivotal movement thereto and adjustable thereon in parallelism with the pivotal axis thereof, a second cam means counterpart complemental to said first counterpart, said counterparts being independently adjustable axially of the pivotable structure to pivot the same, one of said counterparts being selectively manually adjustable in either axial direction to effect relative movement of said counterparts and thereby displace the first thereof for pivoting the pivotal structure from the neutral position to selected of the other positions, and the other of said first and second counterparts being connected with the motor work member for adjustment thereby, pursuant to its ensuing drive, to restore the relative positions of said counterparts and thereby restore said pivotable structure to its neutral position upon drive of the work member a distance and direction corresponding to the distance and direction of manual adjustment of the manually adjustable counterpart.

8. In a mechanism for adjusting a part that is adjustable in opposite directions relatively to an associated structure, the combination of a fluid-actuated motor including a vibratory force transmitter operably connected with said part and operable responsively to respective applications of pressure fluid thereto to cause movement of said force transmitter and hence of said adjustable part in respective opposite directions, valve means fixed with respect to said motor and having a control element adjustable in opposite directions from a neutral position to subject said motor to respective applications of pressure fluid, and valve control means comprising cam means counterparts independently movable in parallelism with the line of vibratory motion of the force transmitter, a first of said counterparts having a slot having laterally offset end portions substantially parallel with said line of vibratory motion and an intermediate diagonal portion interposed between said end portions, the second of said counterparts having a slider portion disposed within said slot where it is cooperable with the intermediate slot portion to cause relative displacement of said counterparts laterally of said line incident to relative movement thereof in parallelism with said line, said counterparts being cooperable to adjust said valve means control element by such relative lateral displacement and occupying a neutral position in such displacement, corresponding to the neutral adjustment of said valve means control element, when said slider portion is at an intermediate section of the diagonal slot portion, one of said first and second counterparts also being selectively settable along said line for displacing said slider portion into either of the slot end portions to accordingly adjust the valve means control element for impressing the motor with a fluid subjection causing movement of the force transmitter in the direction said one counterpart is set along said line, and the other of said counterparts being connected for movement along said line with the force transmitter and being thus operable to reestablish said slider portion in the intermediate slot section for conditioning the valve means control element to stop the motor when the force transmitter has moved a distance corresponding to the setting of the one counterpart.

9. In a mechanism for adjusting a part that is adjustable in opposite directions relatively to an associated structure; the combination of a controllable unit including force-transmitting means operably connected with said part and operable responsively to respective applications of control to cause said force-transmitting means to move said part in respective opposite directions; and control means for said unit, comprising a control element having a linear cam-means-counterpart guide portion and operable pursuant to lateral displacement of said guide portion in opposite directions from a neutral position to impose said applications of control on said unit and to terminate such applications of control and thereby terminate the movement of said part incident to return of said guide portion to the neutral, independently movable cam means counterparts of which a first has a guide slot with laterally offset idler portions extending oppositely from an interposed diagonal portion in parallelism with the cam-means-counterpart guide portion, the second of said counterparts having a slider portion disposed within said slot where it is cooperable with the diagonal slot portion to cause relative displacement of said counterparts laterally of the slot idler portions incident to relative movement of said counterparts linearly of such slot idler portions, said counterparts being disposed in a neutral status to one another while said slider portion is in said diagonal slot portion and being relatively laterally displaceable as aforesaid oppositely from said neutral status to respectively displace the control element guide portion in its opposite directions, one of said first and second counterparts being manually settable in either direction linearly of the idler slot portions and of the cam-means-counterpart guide portion for selectively displacing such counterparts from the neutral status and thus laterally displacing the guide portion of the control element to initiate and determine the direction said force-transmitting means moves said part, means independent of said control element for connecting the other of said counterparts for movement with said force-transmitting means for movement thereby to reestablish said neutral status of the counterparts pursuant to such initiated movement of said force-transmitting means in either direction, and said idler slot portions being receivable of said slider portion to facilitate manual setting of the one counterpart beyond the range afforded by the diagonal slot portion, whereby the one counterpart, subsequent to the movement necessary for displacing the counterparts from neutral, can be instantaneously manually set to select the amount of the initiated movement of the force-transmitting means irrespective of the speed of such initiated movement.

10. In a mechanism for adjusting a part that is adjustable relatively to a supporting structure therefor, the combination of a fluid-actuated motor including a force transmitter operably associated with said part and operable responsively to an application of fluid pressure differential thereto to cause movement of said force transmitter and hence of said part, a source of fluid at a pressure creative of said pressure differential when applied to the motor, valve means comprising an adjusting element adjustable from a neutral condition to subject the motor to the pressure of said fluid, and valve control means comprising cam means counterparts of which a first has a guide slot for a second, said guide slot having a linear idling portion and a deflecting portion joining and projecting angularly from such idling portion, said counterparts being independently movable relatively to said valve means adjusting element lengthwise of the linear slot portion and the second counterpart being disposed in said slot to cause displacement of a certain of said counterparts transversely of the linear slot portion pursuant to such lengthwise movement of either counterpart while the second counterpart is in the deflecting slot portion, said linear slot portion being receivable of the second counterpart in an extended range of their relative movement without causing said displacement of said certain counterpart, said certain counterpart being operably connected with said valve means adjusting element, though movable relatively thereto, to adjust the same from its said neutral condition when displaced as aforesaid in one direction and to readjust said valve means to the neutral condition pursuant to a subsequent retractive displacement in the opposite direction, one of said counterparts being manually movable to displace said certain counterpart in the one direction as aforesaid, and means for connecting the other of said counterparts for movement coordinately with said part and in the direction lengthwise of said idling slot portion to effect said retractive displacement while said part is moved by the motor responsively to the valve means adjustment from neutral.

CARL W. MOTT.

REFERENCES CITED

The following references are of record in the file of this patent:

UNITED STATES PATENTS

| Number | Name | Date |
|---|---|---|
| 334,238 | King | Jan. 12, 1886 |
| 499,276 | Worcester | June 13, 1893 |
| 813,209 | Holmes | Feb. 20, 1906 |
| 978,579 | Grebel | Dec. 13, 1910 |
| 1,208,555 | Helmholtz | Dec. 12, 1916 |
| 1,299,284 | Baader | Apr. 1, 1919 |
| 1,414,654 | Lang | May 2, 1922 |
| 1,552,331 | Millard | Sept. 1, 1925 |
| 2,018,269 | Kuchar | Oct. 22, 1935 |
| 2,109,668 | Johnston et al. | Mar. 1, 1938 |
| 2,213,401 | Lindgren et al. | Sept. 3, 1940 |
| 2,214,817 | Harrington | Sept. 17, 1940 |
| 2,290,052 | Hughes | July 14, 1942 |

FOREIGN PATENTS

| Number | Country | Date |
|---|---|---|
| 5,430 | Great Britain | 1896 |